Patented Aug. 12, 1930

1,772,515

UNITED STATES PATENT OFFICE

LESLIE GORDON LAWRIE, FRANK WILLIAM LINCH, AND ERNEST HARRY RODD, OF BLACKLEY, MANCHESTER, ENGLAND, ASSIGNORS TO BRITISH DYESTUFFS CORPORATION LIMITED, OF MANCHESTER, ENGLAND

DYEING CELLULOSE ESTER AND ETHER

No Drawing. Application filed June 21, 1928, Serial No. 287,346, and in Great Britain July 5, 1927.

It is well known that malachite green and brilliant green (Colour Index Nos. 657 and 662) give green shades on acetate silk and other cellulose ester or ether materials, but their practical application has been restricted because the dyeings fade during storage, particularly when exposed to alkaline conditions.

Our invention relates to a method whereby beautiful green dyeings may be obtained on acetate silk and similar materials, the shades being little affected even in a strongly alkaline atmosphere.

We have discovered that this desirable effect may be achieved by using certain compounds of the malachite green and brilliant green type having, in the anhydride salt form, for example the hydrochlorides, the general formula

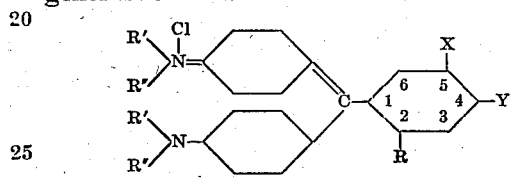

in which R is an alkyl group, R' and R" being either methyl or ethyl. There must also be present other substituent group or groups X and Y (excluding sulphonic acid and metal sulphonate groups) suitably selected to restore the green shade of the dye. The presence of the alkyl group in the position 2 changes the colour from green to blue, but we have found that the green shade is restored by suitably substituting also positions 4 or 5 or both, e. g. by alkyl or alkoxy groups.

A dye of the above structure in which R=R'-R"=methyl, and in which X is a nitro group and Y is hydrogen, gives blue shades, but dyes of this general structure can be obtained which give green shades. In particular we may mention the 2:4-dimethyl compound, obtained e. g., by condensing pp'-tetramethyl-diamino-benzhydrol with m-xylene and oxidizing the product, or by condensing 2:4-dimethylbenzaldehyde with two molecular proportions of dimethylaniline and oxidizing the product, or by condensing pp'-tretramethyl-diaminobenzophenone with 4-chloro-m-xylene in the presence of sodium by the process described in our application Serial No. 251,458 dated 2nd February, 1928. Another such dye is the 2:5-dimethyl derivative of malachite green, prepared e. g. by condensing pp'-tetramethyl-diaminobenzophenone with 2-chloro-p-xylene in the presence of sodium.

Our invention is illustrated, but not limited, by the following example, in which the parts are by weight.

A dyebath is made containing 1% (calculated on the weight of material to be dyed) of the 2:4-dimethyl derivative of malachite green (as oxalate or other salt) and 20% of common salt.

The cellulose acetate silk, after washing or scouring is entered into the cold dyebath and the temperature raised slowly to 75-80° C., the bath being kept at this temperature for 30 minutes.

After dyeing the material is soaped in a 0.25% solution of neutral soap for 10-15 minutes at 40° C. and washed in warm water. The dyed silk is then acidified in a bath containing about ½ oz. of 30% acetic acid in 10 gallons of water and dried without rinsing.

A bright green shade, fast to light, to alkalies, and to alkaline storage is produced.

Using oxalate of 2:4-dimethyl brilliant green, obtained by condensing tetraethyldiaminobenzophenone with 4-chloro-m-xylene by means of sodium a slightly greener and brighter shade with similar properties is obtained.

What we claim and desire to secure by Letters Patent is:—

1. A process for dyeing cellulose esters and ethers in green shades characterized by the application to the material of an anhydride salt of an unsulphonated triarylmethane derivative, the said anhydride salt having the formula

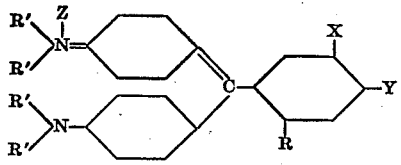

where methyl and ethyl groups are both represented by R', R is an alkyl group, Z is a salt forming radical, and of X and Y at least one is an alkyl or alkoxy group and the other is hydrogen or any substituent except the sulpho group.

2. A process for dyeing cellulose esters and ethers in green shades characterized by the application to the material of an anhydride salt of an unsulphonated triarylmethane derivative, the said anhydride salt having the formula

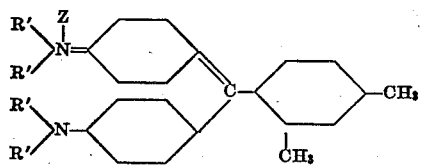

where methyl and ethyl groups are both represented by R', and Z is a salt forming radical.

3. Material made of cellulose esters or ethers and dyed in a green shade with an anhydride salt of an unsulphonated triarylmethane derivative, the said anhydride salt having the formula

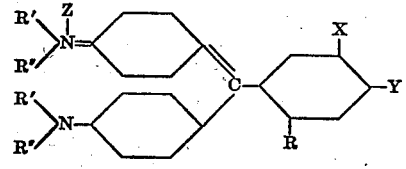

in which R' and R'' are either methyl or ethyl groups, R is an alkyl group, Z is a salt forming radical, and of X and Y at least one is an alkyl or alkoxy group.

In testimony whereof we affix our signatures.

LESLIE GORDON LAWRIE.
FRANK WILLIAM LINCH.
ERNEST HARRY RODD.